United States Patent
Hagimont et al.

(10) Patent No.: US 10,783,108 B2
(45) Date of Patent: Sep. 22, 2020

(54) MEMORY MANAGEMENT PROCESS IN A SET OF INFORMATION PROCESSING DEVICES

(71) Applicants: INSTITUT NATIONAL POLYTECHNIQUE DE TOULOUSE, Toulouse (FR); CENTRE NATIONAL DE LA RECHERCHE SCIENTIFIQUE, Paris (FR)

(72) Inventors: Daniel Hagimont, Balma (FR); Alain Tchana, Toulouse (FR)

(73) Assignees: INSTITUT NATIONAL POLYTECHNIQUE DE TOULOUSE, Toulouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 66 days.

(21) Appl. No.: 16/082,488

(22) PCT Filed: Mar. 6, 2017

(86) PCT No.: PCT/EP2017/055116
§ 371 (c)(1),
(2) Date: Sep. 5, 2018

(87) PCT Pub. No.: WO2017/153302
PCT Pub. Date: Sep. 14, 2017

(65) Prior Publication Data
US 2019/0114285 A1 Apr. 18, 2019

(30) Foreign Application Priority Data

Mar. 7, 2016 (FR) ..................................... 16 51891

(51) Int. Cl.
*G06F 15/173* (2006.01)
*G06F 9/50* (2006.01)
*G06F 16/182* (2019.01)

(52) U.S. Cl.
CPC ...... *G06F 15/17331* (2013.01); *G06F 9/5016* (2013.01); *G06F 16/182* (2019.01)

(58) Field of Classification Search
CPC . G06F 15/17331; G06F 16/182; G06F 9/5016
(Continued)

(56) References Cited

U.S. PATENT DOCUMENTS 6,179,489 B1 * 1/2001 So ......................... G06F 9/5044
718/102
6,298,370 B1 * 10/2001 Tang ..................... G06F 9/5044
718/100

(Continued)

OTHER PUBLICATIONS

International Search Report with Translation dated Jun. 6, 2017, for International Application No. PCT/EP2017/055116, filed Mar. 6, 2017, 7 pages.
(Continued)

*Primary Examiner* — Tauqir Hussain
(74) *Attorney, Agent, or Firm* — Christensen O'Connor Johnson Kindness PLLC (57) ABSTRACT

The present invention provides a mechanism whereby active servers are able to extend their RAM by using memory available in standby servers. This can be achieved, without having to take the servers out of their standby mode, by implementing a memory manager operating in at least one active server and configured to directly access the memory of the servers in standby mode, without requiring the processor of these servers in standby mode to be active. In these servers in standby mode, at least their memory, their network card and their communication means are active, whereas at least their processor is in standby mode.

7 Claims, 3 Drawing Sheets

(58) Field of Classification Search
USPC .......................................................... 709/212
See application file for complete search history.

(56) References Cited

U.S. PATENT DOCUMENTS

| | | | | |
|---|---|---|---|---|
| 7,925,922 | B2* | 4/2011 | Baba | G06F 11/2028 |
| | | | | 714/11 |
| 8,874,680 | B1* | 10/2014 | Das | H04L 67/1095 |
| | | | | 709/212 |
| 9,727,578 | B2* | 8/2017 | Eshel | H04L 67/1097 |
| 9,930,110 | B2* | 3/2018 | Atia | H04L 67/1008 |
| 10,171,297 | B2* | 1/2019 | Stewart | H04L 41/0813 |
| 2011/0078467 | A1 | 3/2011 | Hildebrand | |
| 2013/0151701 | A1* | 6/2013 | Jain | G06F 9/5094 |
| | | | | 709/224 |

OTHER PUBLICATIONS

Anagnostopoulou et al., "Energy Conservation in Datacenters through Cluster Memory Management and Barely-Alive Memory Servers," Proceedings of the 2009 Workshop on Energy Efficient Design, Jan. 1, 2009, pp. 1-6.

Gadafi et al., "Thèse: Gestion mèmoire dans une infrastructure rèpartie," Thèse Universitè Toulouse III—Paul Sabatier, Oct. 7, 2013, pp. 1-108.

Written Opinion of the International Searching Authority dated Jun. 6, 2017, for International Application No. PCT/EP2017/055116, filed Mar. 6, 2017, 7 pages.

* cited by examiner

MEMORY MANAGEMENT PROCESS IN A SET OF INFORMATION PROCESSING DEVICES

The present invention relates to a memory management process within a set of data processing devices interconnected by a communication network.

We are currently witnessing the development of an offer based on remote computer services, generally known as cloud computing.

These services are typically hosted in data centres that comprise numerous computers, typically servers, interconnected by a high-speed communication network. These data centres are also called server farms. The services on offer are generally implemented in the form of applications that are executed in virtual machines; these virtual machines are in turn executed in physical servers. A single physical server can host several virtual machines, as long as the physical resources of the server can meet the workload required of the virtual machines. A migration mechanism is implemented to optimise the use of the physical servers, by moving virtual machines from one physical server to another, based on the resources used by each virtual machine. It is therefore possible to concentrate all of the required virtual machines in a small number of physical servers. This concentration process is known as server farm consolidation. With this consolidation process, unused physical servers can be placed in standby mode, thereby reducing the energy consumption of the server farm. This consolidation is generally a dynamic process, whereby the virtual machines migrate towards the servers depending on the workload measured for each virtual machine. When the workload is reduced, the virtual machines are concentrated on a limited and sufficient number of physical servers, while the other servers are placed in standby mode. When the workload increases, the standby servers are activated to host the virtual machines that require their resources. With this mechanism, it is possible to continuously adapt the number of active servers to meet the actual resource demand of the virtual machines in the various hosted services.

It should be noted that server consolidation can be implemented in non-virtualised environments, the applications being migrated by stopping and restarting. The invention can also be implemented in non-virtualised environments, although virtualised environments are the preferred field of application of the invention.

The resources that impact consolidations are primarily the processors that perform the calculations, as well as the random access memory (RAM) required for the data used by the services that execute on the processors. Servers also typically comprise storage units, such as hard drives, but storage requirements are generally managed by independent storage units connected to the servers within a network. Currently-used servers feature a ratio of the processing power to the quantity of available memory that means that this quantity of available memory is the limiting resource for current services such as e-commerce internet services or Enterprise Resource Planning (ERP) systems. Studies have shown that the standard order of magnitude for the processor workload is approximately 20% when the memory is fully used for a physical server in a consolidated server farm. The RAM of the physical server is therefore the limiting resource of the consolidation mechanism.

The purpose of the present invention is to remedy the abovementioned disadvantages by proposing a mechanism that allows active servers to extend their RAM by using the memory available in standby servers. This can be achieved, without having to take the servers out of their standby mode, by implementing a memory manager operating in at least one active server and configured to directly access the memory of the servers in standby mode, without requiring the processor of these servers in standby mode to be active. In these servers in standby mode, at least their memory, their network card and their communication means are active, whereas at least their processor is in standby mode. Hereinafter, the servers are called "zombie" servers.

The invention relates to a memory management process within a plurality of data processing devices interconnected by a communication network, each data processing device comprising at least one processing unit, one RAM module, one network input/output card enabling communications with said communication network and one communication bus enabling communications between these various components, said memory management process comprising: a step whereby an application, executed on a first data processing device of which at least the processing unit is powered, emits a data read or write request to the RAM module of a second data processing device of which at least the processing unit is in standby, whereas at least the RAM module, the network input/output card and the communication bus are powered and functional; a step whereby said data read or write request is received by the network input/output card of said second data processing device and a step whereby the data read or write request is executed by the network input/output card of said second data processing device according to a remote memory access mechanism, said data read or write being conducted in the memory module of said second data processing device without relying on the processing unit in standby mode of said second data processing device.

In a particular embodiment of the invention, the process further comprises a step whereby said second data processing device is placed in standby mode by putting at least its processing unit in standby mode, while at least the RAM module, the network input/output card and the communication bus remain powered and functional.

According to a particular embodiment of the invention, said standby step is implemented in the form of a new ACPI state.

According to a particular embodiment of the invention, the process further comprises a step whereby said application allocates a memory space within the memory module of said second data processing device to a remote memory allocation service.

According to a particular embodiment of the invention, the process further comprises a step whereby the second data processing device notifies said remote memory allocation service, when being placed in standby, of the free memory that can be allocated within its memory module.

According to a particular embodiment of the invention, the process further comprises a step whereby the second data processing device notifies said remote memory allocation service, when being taken out of standby mode, of the free memory that is no longer available within its memory module.

According to a particular embodiment of the invention, said application is a swap system of said first data processing device using as secondary storage the remote memory of said second device.

According to a particular embodiment of the invention, said application is a client module or a file server module within a remote file system using as cache the remote memory of said second device.

The invention also relates to a computer programme comprising instructions for the implementation of each of the steps of the process according to the invention when said programme is executed on a computer.

The invention also relates to a means for storing data, removable or not, partially or fully readable by a computer or a microprocessor comprising the code instructions of a computer programme for the execution of each one of the steps of the process according to the invention.

In a particular embodiment, the steps of the abovementioned process are determined by the instructions of computer programmes.

Consequently, the invention also relates to a computer programme within a data storage medium, the programme being configured to be implemented by a microprocessor, said programme comprising instructions adapted for the implementation of the steps of the abovementioned process.

The programme can use any programming language, and be in the form of source code, object code, or intermediary code between the source code and the object code, for example in a partially compiled form, or in any other required form.

The invention also relates to a data storage medium that can be read by a microprocessor and comprising the instructions of a computer programme as mentioned above.

The data storage medium can be any entity or device that is able to store the programme. For example, the data storage medium can comprise storage means, such as a ROM, for example a microcircuit ROM, or magnetic recording means, for example a hard drive or a flash memory.

Furthermore, the data storage medium can be a transmittable medium, such as an electrical or optical signal, which can be routed through an electric or optical cable, by radio or by other means. In particular, the programme according to the invention can be downloaded onto a storage platform of an internet-type network.

Alternately, the data storage medium can be an integrated circuit in which the programme is included, the circuit being adapted to execute or to be used in the execution of the process described herein.

The abovementioned data storage support and computer programme feature characteristics and advantages that are similar to the process they implement.

Other features and advantages of the invention are explained in the following description, with reference to the appended drawings, which are provided as examples, the invention not being limited thereto.

In this document, the term "server" is used to describe a data processing device used for the purpose of the invention. This term is to be understood in a broad and non-limiting sense. Although the invention relates to servers implemented within data centres, the invention can be used within any broader network of data processing devices.

A server typically comprises a processing unit that includes several physical processors, each processor being made of a multitude of processing cores. For the purpose of clarity, this document does not relate to the distribution of the application among the various cores of the different physical processors, but refers instead to the processor of the server to describe the entire processing unit.

A server is called active when the minimum set of server components enabling the execution of an application and its interaction with other devices is powered and operational, i.e. ready to fulfil its tasks. Typically, these components are the processor, the RAM, the network communication unit and the communication means of these components. When this minimum set of server components is powered and operational, the server is deemed to be active, regardless of whether secondary components, such as certain peripherals and other components, are in standby mode or not.

The server is described as being in standby mode when at least the processor, i.e. the processing unit, is in standby mode. The processor is in standby mode when it is no longer powered and therefore unable to execute a process. It will be explained in further detail below how the standby state of the server can be broken down into different standby states, depending on which components are no longer being powered. However, all these states share one characteristic, which is that at least the processor is in standby mode.

One of the ideas underlying the invention is to enable an application, i.e. a computer programme or a set of computer programmes, to execute on one or several active servers, for the purpose of accessing the RAM of servers in standby mode to which it is connected within a network.

Figure 1:
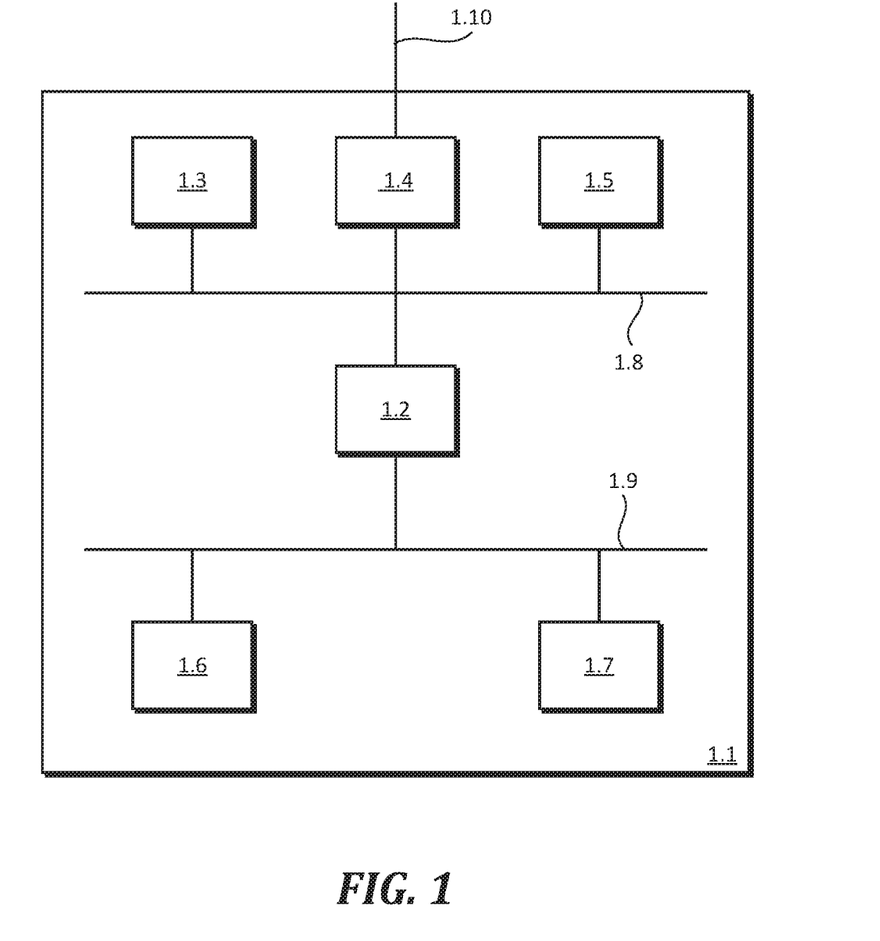
FIG. 1 shows the typical physical architecture of a server or of any data processing device.

FIG. 1 shows the physical architecture of a server or of any data processing device.

The server 1.1 comprises a processing unit 1.2. This processing unit comprises at least one processor that includes one or several processing cores. This unit is in charge of executing the computer programmes that execute on the server. These programmes typically include the server's operating system, software for the execution of virtual machines, called hypervisor, and the set of said virtual machines. The virtual machines include an operating system and applications configured to provide services to the users of the servers.

The processing unit 1.2 is connected to a set of peripherals 1.3 to 1.7 through communication buses 1.8 and 1.9. The peripherals comprise at least one RAM module 1.3. The RAM is a working volatile memory configured to store programmes that are busy executing and the data on which these programmes rely to operate. The processing unit is also connected via a bus 1.8 to a network input/output module 1.4 that connects the server to a communication module 1.10. This network input/output module 1.4 can, for example, be a card meeting the InfiniBand standard enabling its connection to a bus featuring the same name, and enabling a fast interconnection with a set of servers. Other peripherals, such as a SSD drive (Solid State Drive) or a flash memory drive or a GPGPU module (General-Purpose computation on Graphic Processing), 1.5 can be connected to this bus 1.8. In modern machines, the bus 1.8 can be the PCIe (PCI Express) bus. The processing unit 1.2 is also connected through a second communication bus 1.9 to other peripherals, such as permanent storage units including hard drives 1.6, to other input/output peripherals such as a USB interface 1.7, etc.

Figure 2:
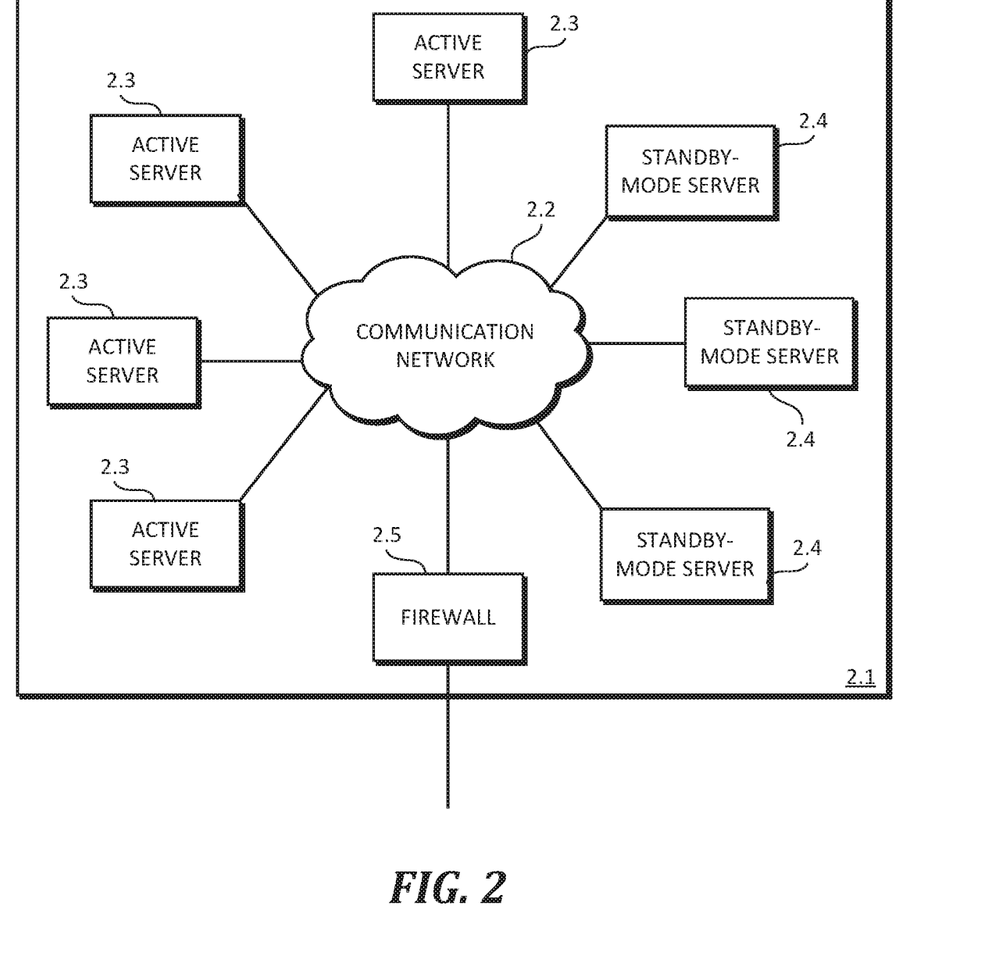
FIG. 2 shows the typical architecture of a server farm.

FIG. 2 shows the typical architecture of a server farm 2.1. This server farm comprises a first set of servers 2.3 that are active. These servers are therefore powered and operational, and host the services provided by the data centre. These services are essentially provided by virtual machines hosted on the active servers 2.3. These servers are interconnected through a communication network 2.2, for example an InfiniBand bus. The server farm is connected externally through a firewall 2.5. This external connection makes the services hosted on active servers accessible to clients outside the farm. For example, an e-commerce internet server is hosted on one or several active servers. A client accesses the service through requests sent according to an http (Hyper Text Transfer Protocol) internet protocol that transits through the firewall 2.5. The server farm 2.1 also hosts a number of servers 2.4 that are in standby mode. This means that these servers are in a state where not all of their components are powered, for power saving purposes. Typically, these servers are not completely shut down, so as to be quickly restarted if the active servers are required to meet an increased workload. In this case, one or several standby servers are activated. One or several services faced with an increased workload are then transferred to or initiated on the recently activated servers to meet the demand of the required workload. Conversely, if the workload is reduced, services that require less workload and initially active on several servers can be migrated towards a single server with sufficient resources to satisfy the workload demand. The servers that are no longer in use can then be switched to standby mode; this is known as the consolidation process. Therefore, dynamically and depending on the actual workload associated with the active services, the services are deployed on a reduced number of servers, said number of servers remaining sufficient to meet the measured workload demand. With this system, only the number of servers that is strictly necessary to operate the active services, in terms of resources, is operational.

One of the primary aspects of the invention resides in the access by services hosted on active servers to the RAM of standby servers. Such access relies on the RDMA (Remote Direct Memory Access) mechanism. Many modern network input/output cards comprise a remote direct memory access mechanism such as, for example, cards meeting the InfiniBand standard implemented by the "InfiniBand trade association". The company Mellanox, for instance, manufactures such cards. The remote direct memory access mechanism enables a programme executed on a remote machine and connected within a network to the target server to send, through the network, the read/write instructions to the memory of the target server. These memory read/write instructions are then executed by the network card and directly impact the RAM of the target server through the bus that interconnects the network card and the memory module, without requiring the intervention of the processing unit, i.e. the processors of the target server. It is therefore clear that the mechanism is operational and can be implemented when the target server is in standby mode, i.e. that at least its processing unit is not powered. Obviously, at least the network card, the communication bus between this card and the memory, and the memory itself must be powered components of the target server.

Typically, the standby states of the servers are currently determined by a standard known as ACPI (Advanced Configuration and Power Interface). This standard defines a set of system states for a computer, in the wider sense, and in particular for a server. The states defined by the standard are Global States G0, G1, G2 and G3. Each one of these states can be subdivided by the implementation of a Sleep State, which is designated by the letter S and followed by an index: S0, S1, S2, S3, S4 and S5.

In particular, the following states are defined:
G0/S0: this is the active state; the computer is fully operational and all of its components are powered.
G1: this is a standby state, where no processor is executing an instruction, although the user has not requested a complete shutdown of the computer. To leave this state, the operating system does not have to re-execute the entire boot sequence, but resumes operations in the state it was in prior to the stop. This state is divided into several sub-states:
G1/S1, (power on suspend): no processor is executing an instruction, but no execution context is lost and the computer is able to leave that state very quickly. In this state, the computer is still powered but the disks are stopped (as in all of the following states).
G1/S2: this is a state of deeper sleep, where the processors must be reinitialised upon activation, and the operating system will then have to restore all of the different execution contexts. This state is documented in the ACPI specification, but it is rarely implemented.
G1/S3, (standby or suspend to ram): in this state the computer shuts down the primary source of power, but the central memory state is maintained with continuous source of power (called 5VSB, for +5V standby). The computer will therefore resume its initial state more quickly than from the G1/S4 state.
G1/S4, (hibernate or suspend to disk: the state of the system (in particular the content of the memory and the execution contexts of the processors) has been saved (in most cases in a hibernation file on the hard drive). None of the components of the computer are powered. When the computer is required to resume operations, the operating system will reload the hibernation file and will restore the state of the computer.
G2/S5, (soft off): the power consumption is reduced to a minimum and none of the current states of the computer have been saved (the user asked the system to shut down completely), but the power intake, albeit stopped, remains connected to a power source that provides continuous 5VSB power (the keyboard, the mouse and the network card remain powered, if the BIOS is configured for that purpose; the computer will be restarted if these are used). When the computer is required to resume operations, the operating system will execute the entire boot sequence before becoming available.
G3, mechanical stop: in this state a mechanical switch has been operated, and human intervention is required to reboot the computer. It may seem that in this state none of the components are being powered, but that is not the case: in a PC for instance, a battery (generally a lithium battery) still powers a small CMOS circuit and maintains some configuration data, as well as a clock.

None of these standby states correspond with the requirements of the invention as they either shut down too many physical components of the machine (which makes it impossible to access the remote memory), or they shut down too few components (which is the same as not shutting down the computer and wasting power).

To meet this requirement, a new standby state, called G1/S3' is defined. In this state, which is close to the state defined by the norm as G1/S3, the processing unit is no longer powered but the network card, the communication bus and the memory module still are. The G1/S3 state means that the RAM state of the device is saved. This typically implies that this memory is maintained in a mode known as Self Refresh mode. In this mode, the memory state is regularly refreshed to enable the saved information to be maintained, but read and write operations are no longer possible. This mode is therefore incompatible with the invention, as the invention must be able to perform read and write operations using memory. Therefore, in the G1/S3' mode defined herein, the memory must be fully operational. Depending on the chosen embodiment of the invention, the memory state of the server can be maintained or not. If an image of the state of the server is maintained in the memory, the memory available for the invention is proportionally reduced.

In a first embodiment of the invention, standby servers in a server farm are switched to standby mode according to the new G1/S3' standby mode defined above. They have a memory card that is compatible with access to a remote memory. The RAM therefore becomes available to services hosted on the active servers, and these services can then extend their memory needs to the memory available in standby servers. It should be noted that the time required to access a remote memory using the remote direct memory access mechanism is roughly the same, in terms of performance, as the time required to access a local memory, and therefore has no impact on active services.

Although it is operational, this first embodiment can generate security risks in terms of memory access. In certain embodiments, the RAM of standby servers contains an image that can be used to quickly reboot the server and that must be protected against possible improper write operations that could corrupt said image. It can also be useful to manage concurrent allocations in the memory of standby servers that are issued by different services executed on the active servers.

In a second embodiment of the invention, a RMMU (Remote Memory Management Unit) service is implemented to manage remote memory allocations/vacancies in standby servers. This remote memory allocation service operates on an active server as it requires an operational processing unit for its execution. Therefore, an application on a server performs a step whereby memory space within the memory module of a second data processing device is allocated with a remote memory allocation service, given that several instances of said application executing on different instances of said first device can compete for the allocation of the memory of a single instance of said second device. When a server is switched to standby mode according to this embodiment of the invention, it informs the remote memory service of the amount of free memory that can be allocated on that server. A service that is executed on an active server and that wants to allocate remote memory on a standby server performs an allocation with the remote memory service and has memory space reserved for it within the memory of one or several standby servers. When an active service no longer requires allocated remote memory, it can vacate space previously allocated with the remote memory allocation service. If a standby server must be activated, it informs the remote memory allocation service that its memory is no longer available. The services that had allocated memory within this server are, in turn, informed that they must vacate memory. The vacated memory can be compensated by a new allocation in other standby servers with the remote memory allocation service. The data is therefore stored in the memory of another standby server.

According to a first implementation example of the invention, the mechanism to access the remote memory is used by the swap system wherein at least one active server is swapped. When a programme is executed on a computer, it is allocated a memory space for its operating requirements. For the purpose of efficiency and memory savings, the actual memory allocation for the programme's operations is less than the maximum memory requirements of the programme. The allocated memory is divided into memory pages, and a swap-on-disk mechanism is implemented. This mechanism is configured to allow a relatively unused memory page to be saved on the disk, in order allocate memory space corresponding to a memory page that is more used. When the programme must access data contained in a memory page that has been saved on the disk, a memory page in the central memory must be vacated to reload the saved page from the disk and make its data available. This commonly-used mechanism limits the memory allocated to the programme at the expense of disk access to manage access to relatively unused data. The more one limits the memory size actually available to the programme, the more the swap-on-disk mechanism is needed when the programme is operating, which further reduces performance levels. In this first implementation example of the invention, the swap system is modified to allow the allocation of remote memory. A two-tier swap mechanism is then implemented. A first swap level enables the swap, i.e. the saving of memory pages, within the remote memory of a standby server. Traditionally, the swap-on-disk mechanism only intervenes when this remote memory space is saturated. As we have seen, the performance of access to the remote memory is of the same order of magnitude as the performance of access to the local memory. The first swap level within the remote memory therefore does not impact the programme execution performance. This mechanism, by extending the memory available to a programme through a swap in the remote memory, therefore limits the usage to the swap-on-disk mechanism and increases the performance of the services on active servers. In a dual manner, it can be considered that the system permits reducing the memory allocated on the active server to the execution of the programme, while maintaining performance levels by the allocation of remote memory, and therefore increases the consolidation of the servers without impacting performance.

In a second implementation example of the invention, the remote memory is used by a remote file system. In this system, a first server within the server farm has storage space, typically in the form of disk space that it makes available to other servers in the farm. This first server is called a file server. The other servers can access the storage space provided by the file server, and are known as clients of the file server. An example of such a server system is the NFS (Network File System) service. Operations of the remote file service require a file server module to operate on the file server, and a client module to operate on the client of the file server. A programme that executes on the client considers the storage space made available by the file server as local storage. Requests to access the data stored on the file server are relayed by the client module to the server module, processed by the file server, and their results are transmitted to the client through the communication server. This mechanism is not described in any further detail as it is well known to the person skilled in the field. Both the clients and the file server must be able to execute client modules and the file server module, and are therefore necessarily hosted in active servers within the server farm. To accelerate access to data memorised in the remote storage space of the file server, both the client module and the file server module maintain a memory cache to save the most recent read or write data in the file server. Therefore, renewed access to this data can be provided from the cache without requiring access to the remote disk, making the process much faster. This cache mechanism, on the client side and on the server side, is well known in remote file systems. The purpose of the invention in this case is to extend the memory space used by caches of the client module and/or of the file server module to remote memory present in standby servers. The performance of the remote file system can then be improved by using caches with a larger capacity, or the size of the memory allocated on the client and/or on the file server can be limited to these caches, for equivalent performance levels. In this example, the invention therefore also enables either increasing performance levels or maintaining performance levels by increasing the consolidation rate of the servers.

In this embodiment, the device is a programmable device that relies on software to implement the invention. However, as an alternative, the present invention can be implemented in the hardware (for example in the form of a specific integrated circuit or ASIC).

Figure 3:
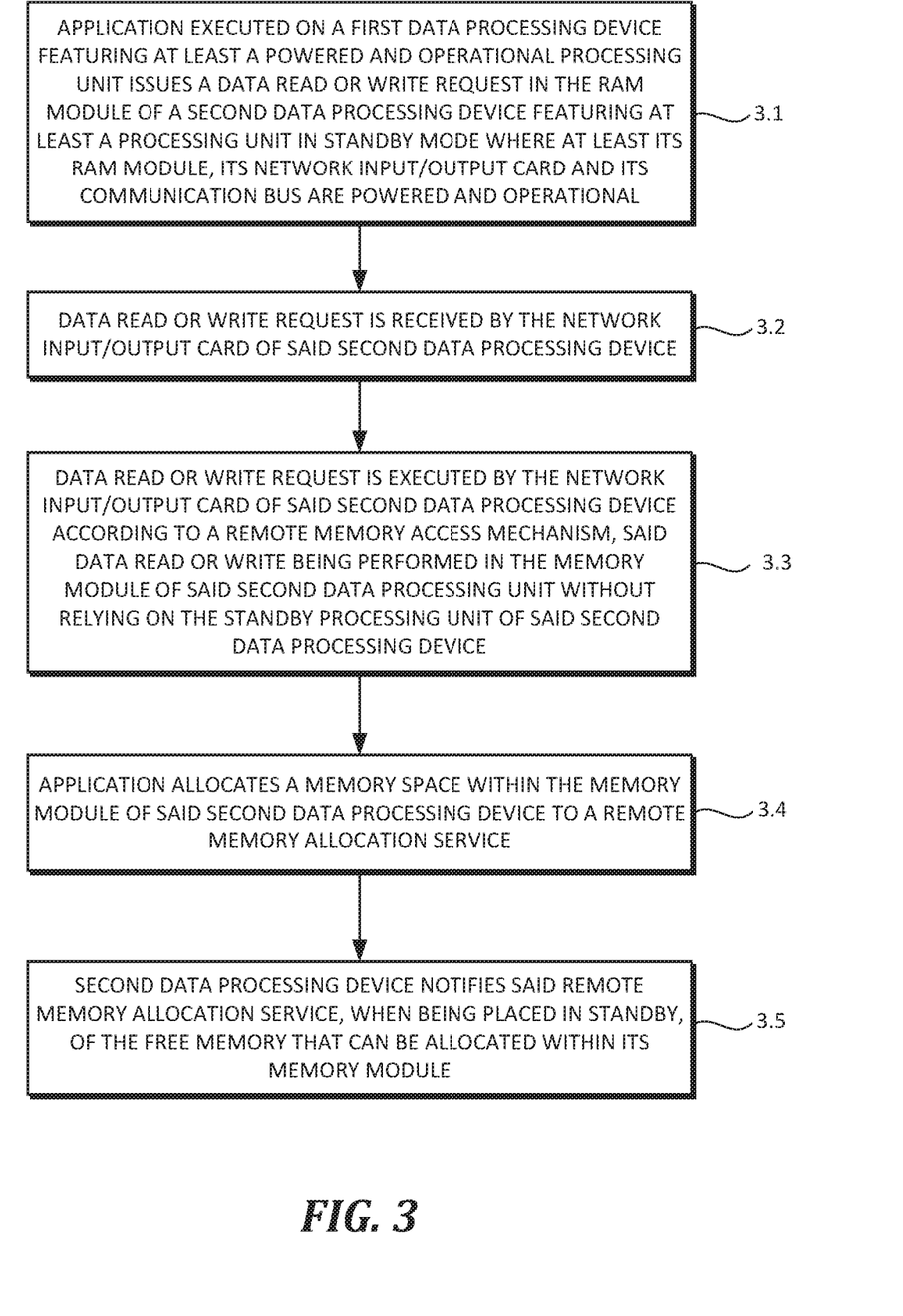
FIG. 3 shows a memory management process within a plurality of data processing devices interconnected by a communication network.

FIG. 3 shows a memory management process within a plurality of data processing devices interconnected by a communication network, each data processing device comprising at least one processing unit, one RAM module, one network input/output card enabling communications with said communication network and one communication bus enabling communications between these various components, said memory management process comprising: a step 3.1 whereby an application, executed on a first data processing device of which at least the processing unit is powered, emits a data read or write request to the RAM module of a second data processing device of which at least the processing unit is in standby, whereas at least the RAM module, the network input/output card and the communication bus are powered and functional; a step 3.2 whereby said data read or write request is received by the network input/output card of said second data processing device; a step 3.3 whereby the data read or write request is executed by the network input/output card of said second data processing device according to a remote memory access mechanism, said data read or write being conducted in the memory module of said second data processing device without relying on the processing unit in standby mode of said second data processing device; a step 3.4 whereby said application allocates a memory space within the memory module of said second data processing device to a remote memory allocation service; and a step 3.5 whereby the second data processing device notifies said remote memory allocation service, when being placed in standby, of the free memory that can be allocated within its memory module.

Naturally, to meet specific requirements, a person skilled in the field of the invention will be able to bring modifications to the above description.

Although the present invention was described with reference to specific embodiments, the present invention is not limited to specific embodiments, and the modifications that are within the realm of the present invention will be evident to any person skilled in the field.

The invention claimed is:

1. Memory management process within a plurality of data processing devices interconnected by a communication network, each data processing device comprising at least one processing unit, one RAM module, one network input/ output card enabling communication with said communication network and a communication bus enabling communication between these various components, said memory management process comprising the following steps:

issuing, by an application executing on a first data processing device featuring at least a powered and operational processing unit, a data read or write request in the RAM module of a second data processing device including at least a processing unit in standby mode wherein said processing unit is no longer powered and therefore unable to execute a process, whereas at least the RAM module of said second data processing device, the network input/output card of said second data processing device and the communication bus of said second data processing device are powered and operational;

receiving said data read or write request by the network input/output card of said second data processing device;

executing said data read or write request by the network input/output card of said second data processing device according to a remote memory access mechanism, said data read or write being performed in the RAM module of said second data processing unit without relying on the standby processing unit of said second data processing device;

allocating, by said application, a memory space within the RAM module of said second data processing device to a remote memory allocation service; and notifying, by the second data processing device, said remote memory allocation service, when said second data processing device is placed in standby mode, of the free memory that can be allocated within its RAM module.

2. Memory management process according to claim 1, further comprising the following step:

placing said second data processing device in standby mode by putting at least its processing unit in standby mode, while at least the RAM module, the network input/output card and the communication bus remain powered and functional.

3. Memory management process according to claim 2 wherein said standby step is implemented in the form of a new Advanced Configuration and Power Interface (ACPI) state.

4. Memory management process according to claim 1, further comprising the following step:

notifying, by the second data processing device, said remote memory allocation service, when being taken out of standby mode, of the free memory that is no longer available within the RAM module of said second data processing device.

5. Memory management process according to claim 1, wherein said application is a swap system of said first data processing device using as secondary storage the remote memory of said second data processing device allocated to said remote memory allocation service.

6. Memory management process according to claim 1, wherein said application is a client module or a file server module within a remote file system using as cache the remote memory of said second data processing device allocated to said remote memory allocation service.

7. A non-transitory computer-readable medium have stored thereon instructions of a computer program for the execution of comprising:

issuing, by an application executing on a first data processing device featuring at least a powered and operational processing unit, a data read or write request in a RAM module of a second data processing device featuring at least a processing unit in standby mode wherein said processing unit is no longer powered and therefore unable to execute a process, whereas at least the RAM module of said second data processing device, a network input/output card of said second data processing device and a communication bus of said second data processing device are powered and operational;

receiving said data read or write request by the network input/output card of said second data processing device;

executing said data read or write request by the network input/output card of said second data processing device according to a remote memory access mechanism, said data read or write being performed in the RAM module of said second data processing unit without relying on the standby processing unit of said second data processing device;

allocating, by said application, a memory space within the RAM module of said second data processing device to a remote memory allocation service; and notifying, by the second data processing device, said remote memory allocation service, when said second data processing device is placed in standby mode, of the free memory that can be allocated within its RAM module.

* * * * *

UNITED STATES PATENT AND TRADEMARK OFFICE
CERTIFICATE OF CORRECTION

PATENT NO. : 10,783,108 B2
APPLICATION NO. : 16/082488
DATED : September 22, 2020
INVENTOR(S) : D. Hagimont et al.

Page 1 of 1

It is certified that error appears in the above-identified patent and that said Letters Patent is hereby corrected as shown below:

In the Claims

| Column | Line | |
|---|---|---|
| 10 | 35 | Claim 4 change "execution of comprising" to --execution of steps comprising-- |

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*